(12) United States Patent
LeBeau et al.

(10) Patent No.: US 12,332,422 B2
(45) Date of Patent: Jun. 17, 2025

(54) SEMI-TRANSPARENT DETECTOR ARRAY AND SPATIALLY TUNABLE FILTER ARRAY

(71) Applicant: L3Harris Technologies, Inc., Melbourne, FL (US)

(72) Inventors: James A. LeBeau, Tempe, AZ (US); Eric Ramsey, Londonderry, NH (US); Jon D. Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 304 days.

(21) Appl. No.: 17/702,688

(22) Filed: Mar. 23, 2022

(65) Prior Publication Data

US 2023/0305285 A1    Sep. 28, 2023

(51) Int. Cl.
| | | |
|---|---|---|
| *G02B 23/08* | (2006.01) | |
| *G09G 3/36* | (2006.01) | |
| *G09G 5/10* | (2006.01) | |
| *H01J 23/54* | (2006.01) | |
| *H01J 31/49* | (2006.01) | |
| *H01J 31/50* | (2006.01) | |

(52) U.S. Cl.
CPC ........... *G02B 23/08* (2013.01); *G09G 3/3611* (2013.01); *G09G 5/10* (2013.01); *H01J 23/54* (2013.01); *H01J 31/49* (2013.01); *H01J 31/50* (2013.01)

(58) Field of Classification Search
None
See application file for complete search history.

(56) References Cited

U.S. PATENT DOCUMENTS

| | | | |
|---|---|---|---|
| 5,051,770 A | 9/1991 | Corneujols | |
| 5,729,010 A | 3/1998 | Pinkus et al. | |
| 6,753,909 B1 | 3/2004 | Westerman et al. | |
| 6,798,578 B1 * | 9/2004 | Beystrum | H04N 5/33 345/9 |
| 6,864,473 B2 | 3/2005 | Chretien et al. | |
| 7,636,115 B2 | 12/2009 | Hong et al. | |

(Continued)

OTHER PUBLICATIONS

European Search Report received for EP Patent Application No. 23161857.0, mailed on Sep. 15, 2023, 9 pages.

*Primary Examiner* — Marcus H Taningco
(74) *Attorney, Agent, or Firm* — NIXON & VANDERHYE P.C.

(57) ABSTRACT

A nightvision system includes an underlying device that provides output light in a first spectrum. A transparent optical device transmits light in the first spectrum from the underlying device through the transparent optical device. The transparent optical device includes an active area of a semiconductor chip. The active area includes active elements that cause the underlying device to detect light from the underlying device and transparent regions formed in the active area which are transparent to the light in the first spectrum to allow light in the first spectrum to pass through from the underlying device to a user. An image processor processes brightness maps produced using light detected by the first plurality of active elements. A tunable filter array coupled to the image processor filters at least a portion of the input light into the underlying device the underlying device based on brightness map processing.

20 Claims, 7 Drawing Sheets

(56) References Cited

U.S. PATENT DOCUMENTS

| | | | |
|---|---|---|---|
| 8,710,415 B2* | 4/2014 | Peyras | F21V 23/0478 |
| | | | 600/249 |
| 9,024,951 B2 | 5/2015 | Frank et al. | |
| 9,030,600 B2* | 5/2015 | Gao | G03B 7/16 |
| | | | 396/173 |
| 10,447,942 B1* | 10/2019 | Shaick | G06T 5/50 |
| 10,685,806 B2 | 6/2020 | Styonavich | |
| 11,054,629 B1 | 7/2021 | Sheydayi et al. | |
| 11,169,380 B2 | 11/2021 | Manly et al. | |
| 2007/0206111 A1* | 9/2007 | Iwane | H04N 23/76 |
| | | | 348/E5.04 |
| 2010/0081127 A1* | 4/2010 | Maier | A61B 5/0075 |
| | | | 435/5 |
| 2016/0165104 A1 | 6/2016 | Gobeli | |
| 2017/0099422 A1 | 4/2017 | Goma et al. | |
| 2018/0184053 A1* | 6/2018 | Engelen | H04N 25/447 |
| 2020/0074603 A1* | 3/2020 | Vollmerhausen | G06T 5/50 |
| 2020/0400944 A1 | 12/2020 | Burnsed et al. | |
| 2021/0349301 A1 | 11/2021 | Becker et al. | |
| 2021/0382303 A1 | 12/2021 | Burnsed et al. | |

* cited by examiner

SEMI-TRANSPARENT DETECTOR ARRAY AND SPATIALLY TUNABLE FILTER ARRAY

BACKGROUND

Background and Relevant Art

Nightvision systems allow a user to see in low-light environments without external human visible illumination. This allows for covert vision in a low-light environment to prevent flooding the environment with human visible light and/or protects the user from being detected due to causing human visible light or light that is otherwise detectable to other nightvision systems to be emitted.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

However, typical nightvision systems have a limited dynamic range (bright versus dark contrast) as compared to the human eye. That is, while the human eye and brain can distinguish details of very brightly illuminated objects and dimly illuminated objects in the same scene, nightvision systems tend to obscure dimly illuminated objects when a brightly illuminated object is present in the same scene. For example, consider viewing a scene of a parking lot with a bright streetlamp. When viewed with the naked eye, one could observe the streetlamp, as well as details regarding individual cars in the parking lot. However, much of that detail may be lost if the scene is viewed through a nightvision system, as the limited dynamic range, automatic brightness controls, and/or other mechanisms may cause details to be lost, such as by washing out the scene and/or causing extreme automatic dimming to compensate for the bright streetlamp. Thus, it may be desirable to implement systems that can better operate in conditions where scenes have both low brightness objects in combination with high brightness objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a nightvision system. The nightvision system includes an underlying device that is configured to provide output light in a first spectrum from input light received at the underlying device. A transparent optical device is optically coupled in an overlapping fashion to the underlying device. The transparent optical device is configured to transmit light in the first spectrum from the underlying device through the transparent optical device. The transparent optical device includes an active area of a semiconductor chip. The active area includes active elements configured to cause the underlying device to detect light from the underlying device and transparent regions formed in the active area which are transparent to the light in the first spectrum to allow light in the first spectrum to pass through from the underlying device to a user. The transparent regions are configured in size and shape to cause the transparent optical device to have a first transmission efficiency for light in the first spectrum. An image processor configured to process brightness maps produced using light detected by the first plurality of active elements is coupled to the transparent optical device. A tunable filter array coupled to the image processor filters at least a portion of the input light into the underlying device the underlying device based on brightness map processing performed by the image processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
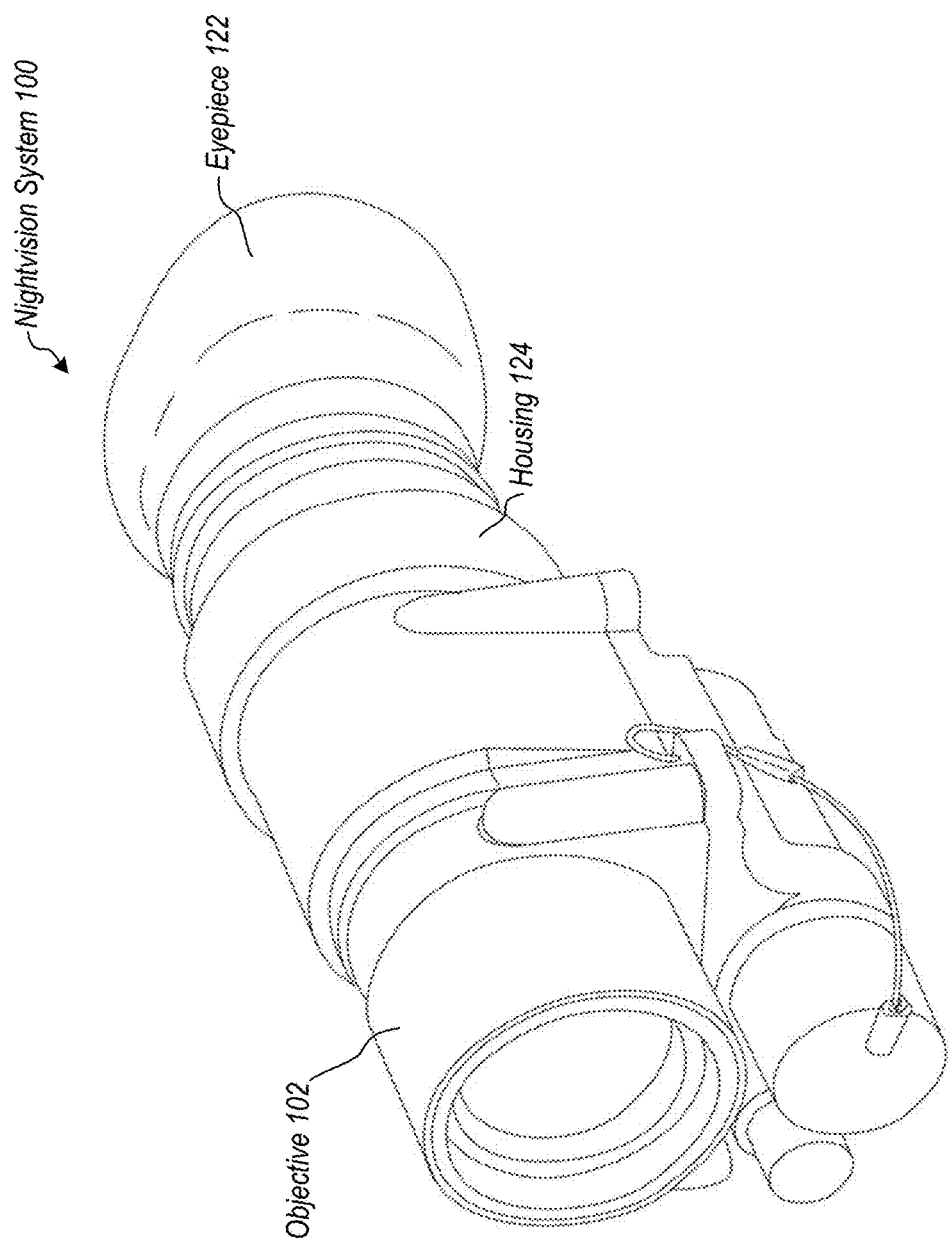
FIG. 1 illustrates a nightvision system.

Embodiments illustrated herein are directed to using a transparent optical device in conjunction with nightvision equipment, such as an image intensifier (or other nightvision system). The transparent optical device includes light detection functionality that is able to detect images and create a brightness map by detecting light produced by the nightvision equipment. Further, the transparent optical device is transparent to light produced by the nightvision equipment to allow the scene detected by the nightvision device to be transmitted to a user. Using the brightness map, embodiments can perform controlled filtering functionality. In particular, automatic filtering functionality can be performed to improve contrast, highlight items detected by the transparent optical device, or perform other functionality. Note that in some embodiments, the transparent optical device may further include display functionality for overlaying additional information on an image produced by the nightvision equipment.

In particular, some embodiments include a transparent display/detector integrated within a nightvision image intensifier system that uses detector imagery for brightness mapping feedback to an actively driven tunable neutral density, or other filter array, such as for example, an LCD or electrochromic filter array. Such a system may be useful for any one of a number of different applications.

For example, some embodiments may be configured to perform automated bright source protection. In particular, some nightvision systems can be damaged by overly bright light. Thus, embodiments can detect light that exceeds a predetermined threshold and apply filtering to prevent damage to the nightvision system.

Alternatively, or additionally, embodiments can be used for daylight and high fluence situation use. For example, laser light directed at a nightvision system can damage the system and/or prevent a user from properly using the nightvision system. Embodiments illustrated herein can detect such bright lights using the transparent optical device and image mapping, and use the controllable tunable filter array to mitigate such lighting.

Alternatively, or additionally, embodiments can be used for halo obscurance reduction. In particular, certain light emitting objects in a scene can cause halos to appear in the scene in some embodiments, filtering can be performed to reduce and/or eliminate the halo.

Alternatively, or additionally, embodiments can be used for improved/optimized native dynamic range of tube gain mechanisms for improving or optimizing a modulation transfer function for the system.

Alternatively, or additionally, embodiments can be used for increasing scene dynamic range.

Embodiments illustrated herein are directed to using a transparent optical device in conjunction with nightvision equipment, such as an image intensifier (or other nightvision system). The transparent optical device includes light detection functionality that is able to detect brightness maps by detecting light produced by the nightvision equipment. Further, the transparent optical device is transparent to light produced by the nightvision equipment to allow light produced by the nightvision equipment to be transmitted to a user. Using the detected brightness map, embodiments can perform filtering functionality. In some embodiments, filtering functionality may be aided by using features such as object edge detection, object recognition, identifying regions of interest, etc. in a brightness map. In particular, automatic filtering functionality can be performed to improve contrast, and/or based on various items detected by the transparent optical device. Note that in some embodiments, the transparent optical device may further include display functionality for overlaying additional information on an image produced by the nightvision equipment.

Additional details are illustrated. Attention is now directed to FIG. 1, where a specific example of a nightvision system is illustrated. In particular, FIG. 1 illustrates the PVS-14 nightvision system 100. In the example illustrated, the nightvision system 100 includes a housing 124. As will be illustrated in more detail below in other figures, the housing 124 houses an image intensifier, a transparent optical device (see e.g., FIGS. 3A, 3B and 3C and transparent optical device 118), and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for filtering images created by the nightvision system 100, including images created by an image intensifier and images created by a transparent optical device, into the eye of the user.

Figure 2:
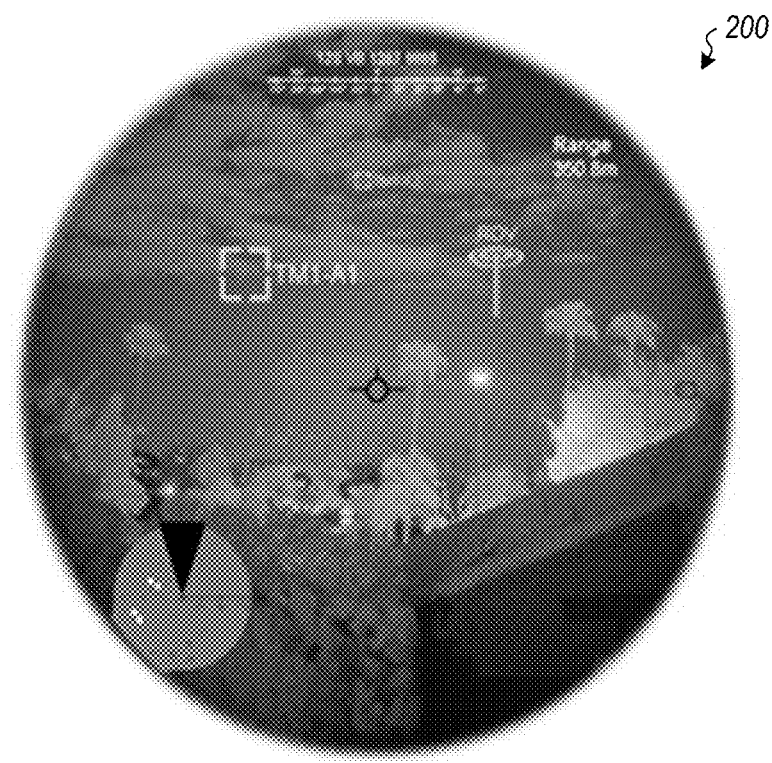
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an intensifier tube. Some embodiments described herein are directed to implementing a heads-up display implemented by adding image overlay capabilities with a nightvision system, where the image overlay capabilities are added by using a transparent optical device including a display.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc. In some embodiments, the heads-up display can superimpose thermal image data over intensified light images. In particular, a nightvision system 100 may include (or at least have access to data from) thermal cameras for detecting thermal characteristics in an environment. Data from thermal cameras can be used to control the transparent optical device 118 to display thermal imaging data, correlated with artifacts in intensified light images, to the user. For example, various colors can be used to represent various temperatures where the colors are output by the transparent optical device 118 to the user. The colors are overlaid on intensified light image artifacts to indicate temperature of objects in an environment. Note that the transparent optical device 118 (or other elements) includes photodetectors for detecting intensified light to determine brightness in a scent, the locations of various objects in the field of view, or other information. This information can be used for filtering functionality as described above and in more detail below, correlating thermal colors, target indicators, or other images output by the transparent optical device 118.

Figure 3A:
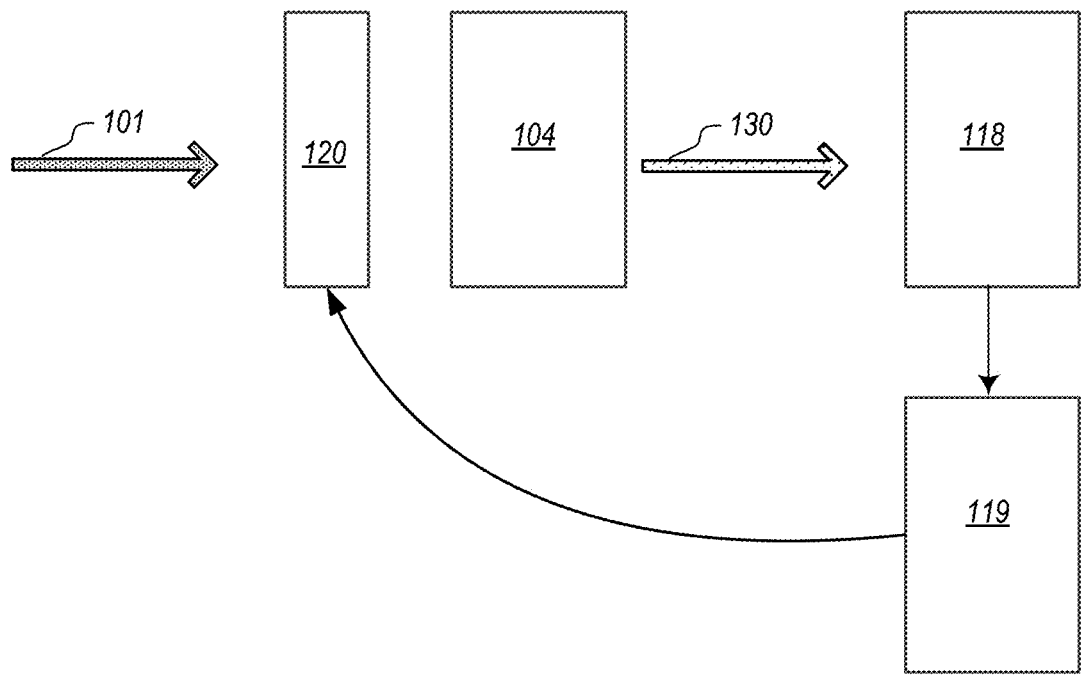
FIG. 3A illustrates a block diagram of a nightvision system including a controllable tunable filter array.
Figure 3B:
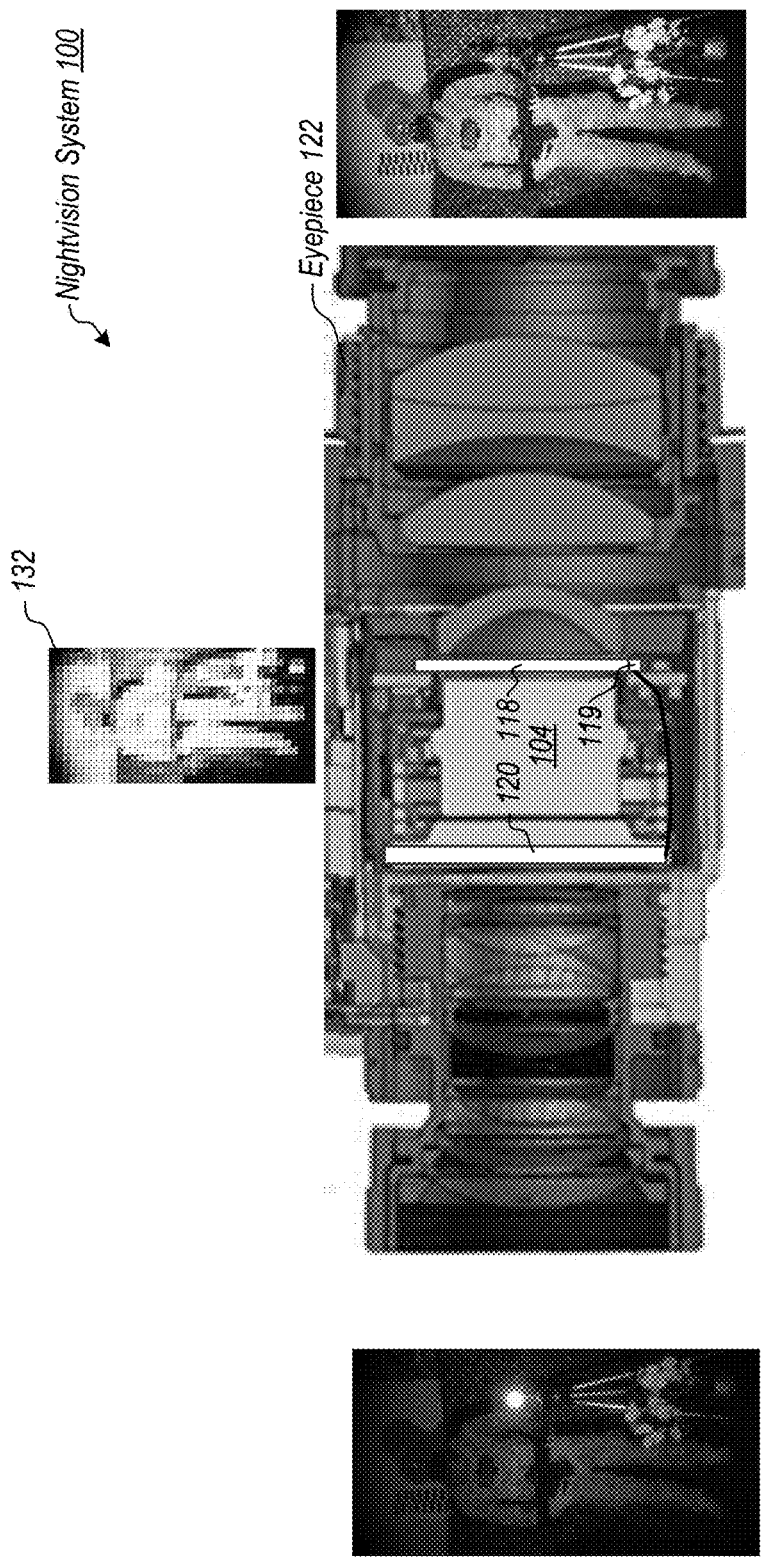
FIG. 3B illustrates a cutaway diagram of components of a nightvision system with a controllable tunable filter array.
Figure 3C:
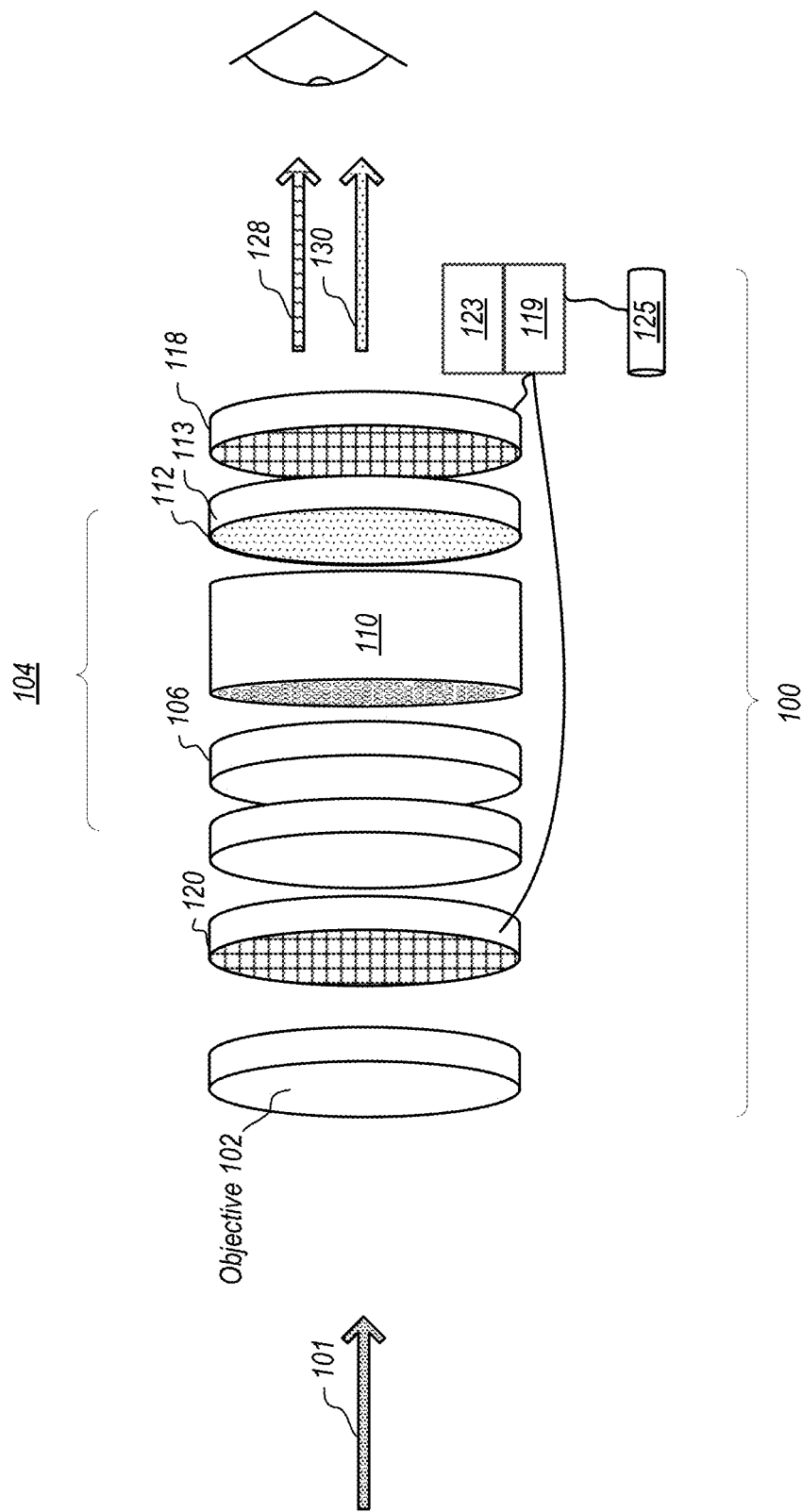
FIG. 3C illustrates a block diagram of components of a nightvision system with a controllable tunable filter array.

Attention is now directed to FIGS. 3A, 3B and 3C. FIGS. 3A, 3B and 3C illustrate a block diagram, a cutaway and a block diagram respectively of embodiments of the invention. A nightvision system typically includes an objective 102 to focus input light 101 into an underlying device 104.

It should be appreciated that in various embodiments, the underlying device 104 may be one or more of a number of different types of nightvision devices, such as IR CCD cameras, CMOS cameras, image intensifiers, and the like. In the example illustrated in FIG. 3C, the underlying device 104 is an image intensifier. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not viewable in the viewable spectrum for human observers. A third source of light may be light emitted by an object itself. For example, this may be related to visible light, infrared heat energy emitted by the object and directed into the objective, etc. Nonetheless, the nightvision system is able to convert the light emitted from the source into a viewable image for the user.

The objective directs any input light 101 into the underlying device 104. Note that the underlying device 104 may include functionality for amplifying light received from the objective to create a sufficiently strong image that can be viewed by the user. This may be accomplished using various technologies, in the image intensifier example of FIG. 3C, such as a photocathode 106, a microchannel plate 110, and a phosphor screen 112. The photocathode 106 may be configured to generate photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1) of a nightvision system where it can be output to the user. This fiber-optic 113 can be twisted 180 degrees to undo the inversion caused by the system objective to allow for convenient direct viewing of the screen.

FIGS. 3A, 3B and 3C further illustrate the transparent optical device 118. The transparent optical device 118 allows intensified light to pass through the transparent optical device 118, but also, in some embodiments, generates its own light, from LEDs or other light emitters, to transmit to a user. Creating a transparent optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

The transparent optical device 118 is typically implemented behind the fiber-optic 113 (i.e., closer to the eyepiece than the fiber-optic 113), but in other embodiments may be implemented in front of the fiber-optic 113. The use of a fiber-optic within nightvision systems inverts and translates the focal plane allowing the transparent optical device 118 overlay to be presented on either side without impacting the ability for the eyepiece to filter on the image. However, certain manufacturing or mechanical constraints may incentivize placement of the transparent optical device 118 behind the fiber-optic including the difficulty in inserting electronics within the vacuum package. Placing the transparent optical device 118 external to the fiber-optic can be done to allow the transparent optical device 118 to be applied after the image intensifier tube has been manufactured and sealed, lowering production difficulties. As discussed above, the transparent optical device 118 may include functionality for displaying information to a user. Such information may include graphical content, including text, images, and the like. In some embodiments, the transparent optical device 118 may display in shaded monochrome. Alternatively, or additionally, the transparent optical device 118 may display in multiple colors. Alternatively, or additionally, the transparent optical device 118 may display in 1-bit monochrome.

In the example illustrated in FIGS. 3A, 3B and 3C, the transparent optical device 118 outputs display light 128 which can be sent to the eyepiece (such as the eyepiece 122 illustrated in FIG. 1). As noted previously, the intensified light 130 is also provided to the eyepiece. Thus, an image such as that illustrated in FIG. 2 is presented to the user in the nightvision system.

As noted previously, the transparent optical device 118 is composed of active silicon elements, typically in a grid arrangement to implement various pixels. The active elements cause the device to have certain optical performance capabilities. Such capabilities may be one or more of abilities to output color output, output monochrome output, detect light, have a certain pixel density, have a certain pitch, etc. In particular, the transparent optical device 118 is a digital detector and potentially display having a certain pixel density for the detector and potentially a display. Often, each pixel is implemented on a single active island, although in other embodiments, an island may have multiple pixels, or even only a single sub-pixel element. Each pixel may have one or more transistors controlling one or more OLED emitters (or other light emitting devices). Pixels may additionally or alternatively include light detectors. This can be useful for detecting the intensified light from the phosphor screen 112 or other optical output when other underlying devices are used. This detected light can be used for filtering functionality and/or to characterize an image intensifier image. For example, the detected light can be used for recording scene events. Alternatively, or additionally, the detected light can be used for improving placement of elements displayed on the heads-up display shown in FIG. 2. For example, edge detection techniques may be used using the detected light, and images generated and displayed by the transparent optical device 118 can be keyed off of these detected edges. Edge detection techniques may be used using the detected light, and control of the tunable filter array 120 can be keyed off of these detected edges.

In any case, the transparent optical device 118 is representative of a stacked device formed in a semiconductor chip that overlaps an underlying device 104, in the case shown in FIG. 3C, the underlying device 104 is an image intensifier. The transparent optical device 118 is transparent to light in a first spectrum (according to some predefined transmission efficiency), which in this case is the visible spectrum of light output by the phosphor screen 112. That is, the transparent optical device 118 is not fully transparent due to the blocking of the active devices, but transparency referred to herein refers to at least partial transparency according to some transmission efficiency. Note that overlapping as used herein means that elements are in the same optical path. This can be accomplished by having elements be in coaxial alignment when the optical path is straight. Alternatively, this can be accomplished by using various waveguides or other elements to align optical paths thus not requiring physical coaxial alignment.

A photodetector implemented in the transparent optical device absorbs a portion of the intensified light converting it to an electrical signal. For example, the photodetector can be a two-dimensional array of light detectors, such as photodiodes, that generates charge currents, or any other form of digital data level proportional to intensity of the intensified light as a function of position. Accordingly, the photodetector may generate a two-dimensional array of electrical charge that represents the intensified image. In some embodiments, this two-dimensional array of electrical charge can be periodically read from the photodetector (e.g., the detected signal can be read from the photodetector like in a charged coupled device (CCD) camera). In some embodiments, the two-dimensional array of electrical signals from the photodetector is processed (such as by the image processor 119) and/or used locally, e.g., within the transparent optical device 118, at the readout or pixel levels, to modulate in real time the amplitude of the display light 128 emitted from the transparent optical device 118.

Figure 5:
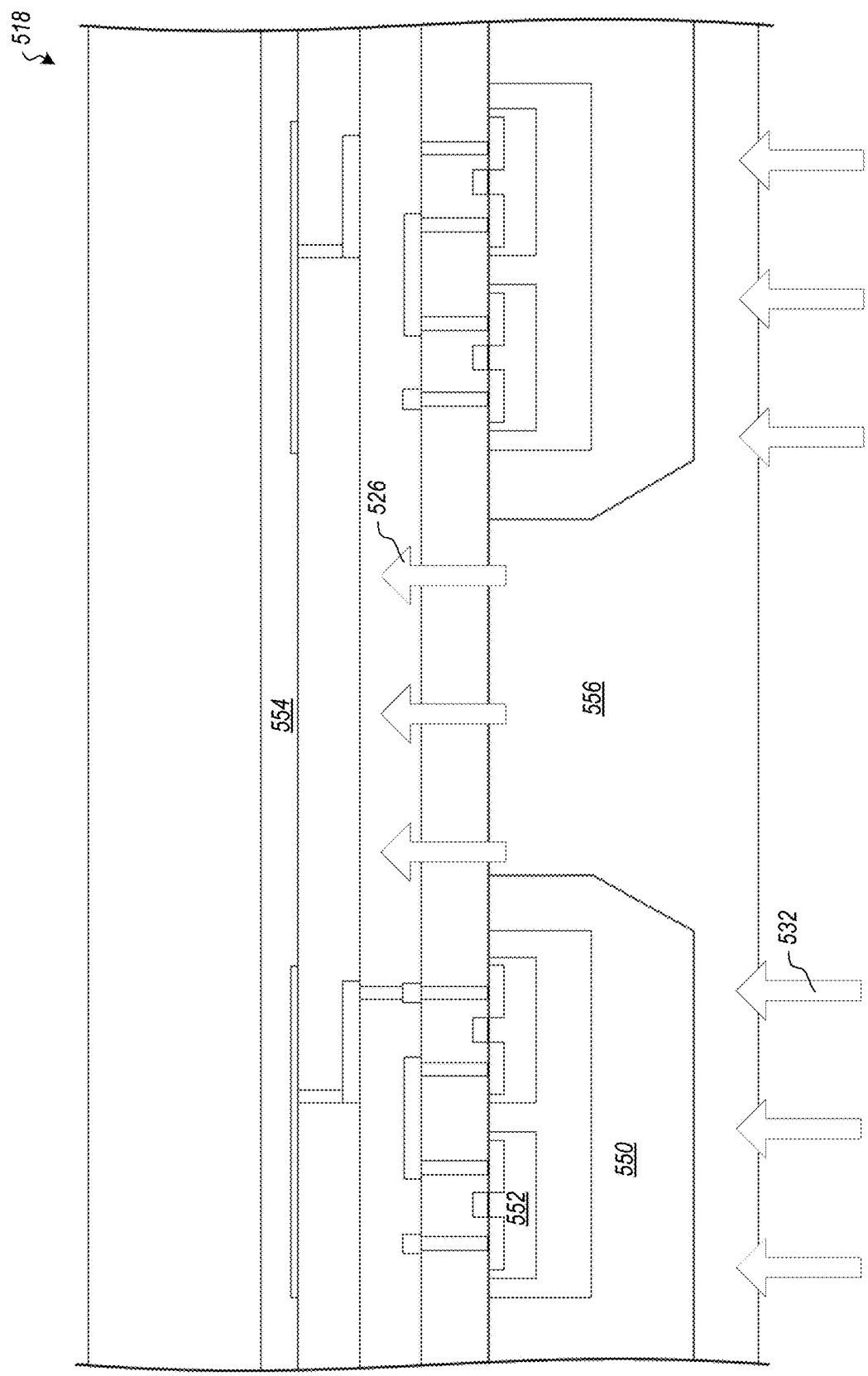
FIG. 5 illustrates a transparent display structure cross-section view, including transparent regions.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials. For example, reference is now made to FIG. 5 which illustrates a transparent optical device 518 including active silicon islands (which may be native silicon islands) such as active silicon island 550. In particular, active silicon islands include transistors such as transistor 552 which control detectors and potentially OLED emitters in an OLED stack 554. In the example illustrated in FIG. 5, each of the active silicon islands represents a pixel or sub-pixel of the transparent optical device 518. Thus, an image can be detected by active elements in the active region. Additionally, in some embodiments, by illuminating various LEDs in the OLED stack 554 using the transistors in the active silicon islands, an image can be created and output to a user, such as by outputting display light such as the display light 128 illustrated in FIG. 3B.

As illustrated in FIG. 3B, intensified light is transmitted through the transparent optical device 118 to the eyepiece of the nightvision system, and then to the user. Note, however, that the intensified light is transmitted to the user through the transparent optical device 118, meaning that the intensified light will be affected by characteristics of the transparent optical device 118. In the example illustrated in FIG. 3C, light 128 represents the light output by the light emitting portions of the transparent optical device 118. Light 130 represents intensified light from the phosphor screen 112 transmitted through the transparent optical device 118. That is, light 130 may include or may be, in its entirety, light in the first spectrum.

Referring once again to FIG. 5, light 526 represents a portion of light that is transmitted through transparent regions, illustrated by transparent region 556, of the transparent optical device 518, while light 532 represents a portion of light that is blocked by active portions of the transparent optical device 518. Note that in some embodiments, the transparent region 556 is backfilled with a transparent back fill material.

However, transmission of light through the transparent optical device is nonetheless increased by removing portions of silicon that are not needed for implementing active electrical components or for supporting metal traces. For example, consider an example where dynamic pixel cells are used. In this particular example, assume that there are two sub pixels per pixel. Anode size for the sub pixels is 8 µm×5.1 µm. Pixel area is 10.1 µm×12.4 µm. Pixel pitch is 22.5 µm×22.5 µm. In one example, this provides a resolution of 800×800. In this particular transparent optical device, if non-active silicon islands (not shown) that are typically implemented are not removed, transparency of the transparent optical device is about 33%. In contrast, transparency is about 61% if the non-active silicon islands are removed such as in the structure illustrated in FIG. 5. Thus, in this example, transparency of a transparent optical device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that transparent optical device will have a lower transparency than an equivalently sized transparent optical device with a lower resolution. Thus, for example, a transparent optical device with a 36 µm pitch can obtain a transparency of 81%, while a transparent optical device of 22.5 µm pitch can obtain a transparency of 67%, while a transparent optical device having a 17.5 µm pitch will be about 55% transparency when non-active silicon islands are removed from the transparent optical device in each of the illustrated examples. Thus, some embodiments may be able to create a transparent optical device with at least a 36 µm pitch with at least a transparency of 75%, or a transparent optical device of at least a 22.5 µm pitch with at least a transparency of 60%, or a transparent optical device having at least a 17.5 µm pitch with at least a 50% transparency when silicon is removed between active silicon islands. The preceding illustrates one specific example related to a particular manufacturing process.

Pitch and transparency values may be specific to a given semiconductor manufacturing process—also known as the technology or process node—and will of course vary as the node changes. Typically designating the process's minimum feature size, the technology node will dictate the area of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

In the example illustrated in FIG. 3C, light 101 is input into the objective 102, where it is transmitted to an underlying device 104, in this case, an image intensifier. FIGS. 3A, 3B and 3C further illustrate the transparent optical device 118. As noted previously, the transparent optical device 118 includes light detectors that are able to detect light produced by the underlying device 104 to produce a brightness map 132. The brightness map 132 indicates different light levels in different portions of a scene. In particular, analysis of the brightness map can show variations in brightness of a scene detected by the underlying device 104. FIGS. 3A, 3B and 3C further illustrate an image processor 119. The image processor 119 is able to process brightness maps produced by the detectors in the transparent optical device 118. In particular, the image processor 119 can analyze and identify the brightness variations in the brightness map.

The image processor 119 is further connected to a tunable filter array 120. The tunable filter array 120 is configured to filter light coming into the underlying device 104 based on the image processing.

Figure 4:
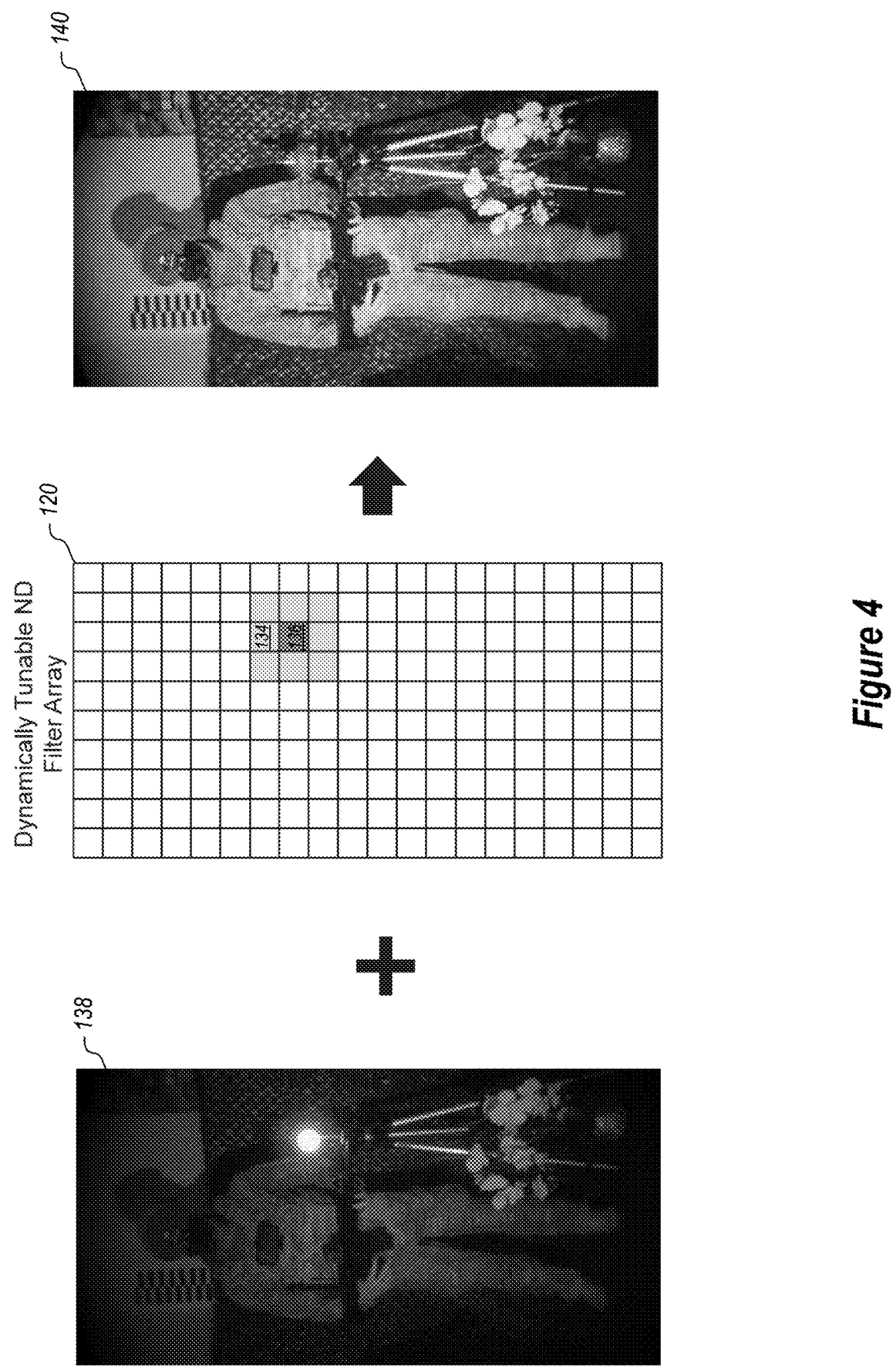
FIG. 4 illustrates filtering input light based on a brightness map and using a dynamically tunable filter array.

The tunable filter array may be, for example, actively driven tunable neutral density filter array, such as for example, an LCD or electrochromic filter array. The tunable filter array can work in a non-spectrally sensitive way so as to block a portion of the incoming light using a modifiable medium that acts substantially equally on all wavelengths over a certain range. Alternatively, or additionally, embodiments may implement a filter array that operates by lowering photon transmission that is not spectrally neutral meaning that the filter array blocks certain wavelengths more than others. Further, combinations of the above may be implemented. These combinations may be spatial in nature (i.e., different portions of the filter array having different functionality), temporal in nature (i.e., portions of the filter array filtering differently in time), etc. FIG. 4 illustrates an example of a tunable filter array 120 implemented in an array format. As illustrated in FIG. 4, different pixels of the tunable filter array 120 can be actuated at varying levels. For example, FIG. 4 illustrates a pixel 134 which filters approximately 15% of light incident at that pixel 134. Pixel 136, by contrast, filters about 50% of light incident at that pixel 136. The amount of filtering can be controlled based on the desired effect, as will be illustrated in more detail below.

The tunable filter array 120 may be caused to provide a particular selectable pattern of filtering based on the processing to produce a desired filtering effect.

Some embodiments may be implemented in a fashion to optimize dynamic range of an underlying device. In particular, devices tend to operate more consistently, more linearly, and/or with other dynamic range features in certain ranges of operation. This operating voltage can be selected in linear regions of operations and/or regions that provide the most dynamic range to allow for wider variations in exogenous light. The way an image intensifier power supply device adjusts operational voltages to result in ABC (auto brightness control), BSP (bright source protection), and auto gaiting has dynamic range ramifications. Filtering control is performed in concert with the intensifier power supply to optimize scene dynamic range. Thus, dynamic range optimization results from integration of filter control with image intensifier power supply control to apply optimal cathode, microchannel plate, and screen voltages. This can be done by spatially filtering large portions, or even the entirety of light incident the tunable filter array 120, or by spatially filtering portions of light incident the tunable filter array that correspond with bright light anomalies in a scene.

Some embodiments may be configured to perform automated bright source protection. In particular, some nightvision systems can be damaged by overly bright light. Thus, embodiments can detect light that exceeds a predetermined threshold and apply filtering to prevent damage to the night visions system. FIG. 4 illustrates an example of this where a pre-filter image scene 138 is illustrated with a bright spot caused by a light in the scene. This bright spot can be detected by the transparent optical device 118, analyzed by the image processor 119, and used to control the tunable filter array 120 as illustrated in FIG. 4 to perform bright spot protection and to produce the post filter image 140 of the scene, which is transmitted through the transparent optical device 118 to the user.

Alternatively, or additionally, embodiments can be used for daylight and high fluence situation use. For example, laser light directed at a nightvision system can damage the system and/or prevent a user from properly using the nightvision system. Embodiments illustrated herein can detect such bright lights using the transparent optical device 118 and image mapping, and use the image processor 119 to control the controllable tunable filter array 120 to mitigate such lighting.

Alternatively, or additionally, embodiments can be used for halo obscurance reduction. In particular, certain light emitting objects in a scene can cause halos to appear in the scene in some embodiments, filtering can be performed to reduce and/or eliminate the halo. Consider the example illustrated in FIG. 4. In some embodiments, a ring of pixels in the tunable filter array 120 can be used to filter halo lights. Thus, for example, pixel 136 used to filter light to the underlying device 104 to reduce or eliminate halos around lighted objects in a scene, by preventing the intensifier from creating the halo.

Alternatively, or additionally, embodiments can be used for improved/optimized native dynamic range of tube gain mechanisms for improving or optimizing a modulation transfer function for the system. Alternatively, or additionally, embodiments can be used for increasing scene dynamic range. Again, as illustrated in FIG. 4, contrast and gain can be enhanced by filtering out bright lights in a scene.

Alternatively, or additionally, embodiments can be used for local saturation reduction. Sticky images and film charging are examples of local saturation. Consider the case when using a system where ghosting or other similar effects occur in a viewed image as a result of bright objects in a scene. These effects can be mitigated by reducing the brightness of the objects with respect to other objects in the scene.

Alternatively, or additionally, embodiments can be used for increasing the Detection, Recognition, and Identification (DRI) range. That is, by enhancing contrast, blocking saturating light, etc., embodiments can improve DRI. Detection is used for detecting presence or movement of an object. Recognition involves recognizing more general characteristics about an object. Identification involves identifying specific features of an object, such as for features that may be used to specifically identify and unique object.

Note that in some embodiments, the tunable filter array may be controllable to filter light for highlighting scene elements. This can be done, for example, to attempt to filter light to highlight a specific object or specific region of interest. This control may be accomplished in one or more of a number of different fashions. For example, in some embodiments, light associated with objects that are not being highlighted can be filtered out to highlight certain objects. Alternatively, outlines can be created around objects by filtering out light around an object. Etc.

In some embodiments, filtering functionality may be aided by using features such as object edge detection, object recognition, identifying regions of interest, etc. in a brightness map. This may be accomplished in some embodiments by the image processor including certain artificial intelligence and/or machine learning functionality. In particular, detected edges, objects, regions, etc. can be highlighted as described above, based on analyzing brightness maps. Indeed, when combined with artificial intelligence and/or machine learning, even more drastic improvement to DRI and augmented reality awareness by drawing attention to designated (manually, externally, or automatically) regions of interest (ROI) or obscuring regions of non-interest can be achieved.

Highlighting by filtering can be used, for example, to highlight known hand gestures-identified through artificial intelligence and/or machine learning characterization. Alternatively, or additionally, highlighting by filtering can be used to highlight laser designation of targets.

Thus, embodiments include a nightvision system 100. The nightvision system 100 includes an underlying device 104. For example, an image intensifier is an example of an underlying device. Note that other underlying devices may be used in addition or alternatively. For example, some embodiments may include infrared CCD based or other low light level digital sensor system. The underlying device 104 is configured to provide output light in a first spectrum from input light received at the underlying device 104. Thus, for example, the first spectrum may be light produced by the phosphor screen 112.

The nightvision system 100 includes a transparent optical device, such as transparent optical device 118, optically coupled in an overlapping fashion to the underlying device 104. The transparent optical device 118 is configured to transmit light in the first spectrum from the underlying device 104 through the transparent optical device 118. The transparent optical device 118 includes: an active area of a semiconductor chip.

The active area includes a plurality of active elements configured to cause the underlying device 104 to detect light from the underlying device 104. For example, as described above, light detectors integrated into a photodetector may be used to detect light from the underlying device 104.

The transparent optical device 118 further includes a plurality of transparent regions formed in the active area which are transparent to the light in the first spectrum to allow light in the first spectrum to pass through from the underlying device 104 to a user. The transparent regions are configured in size and shape to cause the transparent optical device 118 to have a particular transmission efficiency for light in the first spectrum.

The nightvision system further includes an image processor, such as image processor 119 coupled to the transparent optical device 118. The image processor is configured to process brightness maps, such as brightness map 132, produced using light detected by the plurality of active elements.

The nightvision system further includes a tunable filter array, such as tunable filter array 120, coupled to the image processor 119. The tunable filter array 120 is configured filter at least a portion of the input light into the underlying device 104 based on image processing performed by the image processor 119.

As noted previously, the nightvision system may be implemented where the underlying device 104 comprises an image intensifier.

The nightvision system may be implemented where the image processor performs edge detection. For example, such edge detection may be implemented using Sobel edge detection and/or Canny edge detection. In some such embodiments, the tunable filter array is configured to filter at least a portion of the input light into the underlying device 104 based on the edge detection. Thus, for example, embodiments may be configured to provide filtering in an attempt to cause edges to have a particular characteristic as determined by the edge detection. For example, embodiments may be configured to cause the tunable filter array 120 to provide filtering to cause a certain contrast for a certain object in an environment. In some embodiments, overall scene contrast can be sacrificed to improve contrast on a particular object or region. Similar functionality may be performed for region detection and enhancing contrast for a particular region.

In some embodiments, the nightvision system may be implemented where the image processor performs object recognition. In some such embodiments, the tunable filter array is configured to filter at least a portion of the input light into the underlying device 104 based on the object recognition. This can be implemented in a number of different fashions. For example, in some embodiments the nightvision system may be configured to perform filtering functionality for a largest object detected in a nightvision scene. Alternatively, embodiments may be configured to perform filtering functionality based on detection and classification of objects. For example, the image processor 119 may be able to identify that a certain object detected in a nightvision scene is likely a stop sign while a different object detected in the nightvision scene is likely a human. In this example, an algorithm may be implemented to cause the tunable filter array 120 to filter at least a portion of the input light into the underlying device to enhance indications for the object detected as a human while deprioritizing, and thus not enhancing, the object detected as a stop sign. Note that in some embodiments, the nightvision system 100 may include functionality for allowing user input to specify priorities when determining filtering functionality. For example, for specific missions, a user may wish to prioritize filtering functionality for objects classified as vehicles over objects classified as humans. Alternatively, a user may wish to prioritize filtering functionality for objects classified as animals over objects classified as humans. Thus, a user can specify priorities, and filtering functionality will be performed using the tunable filter array 120 on preferred objects recognized by the system.

Alternatively, or additionally, in some embodiments a user may be able to specify specific objects and not simply a classification of objects. For example, a user may be able to specify information to particularly identify a particular human based on height, weight, build, posture, or other characteristics. Thus, some embodiments may be able to specifically perform filtering functionality when the image processor 119 detects, within some acceptable probability, that a detected object can be classified as a specific object, such as a specific human. Similar functionality can be used for sub classifications of objects. For example, a user could specify filtering functionality should be prioritized for trucks whereas other vehicles such as cars, motorcycles, etc. are not prioritized as highly for filtering functionality.

The nightvision system 100 may be implemented where the image processor performs region of interest detection. In some such embodiments, the tunable filter array is configured to filter at least a portion of the input light into the underlying device 104 based on the region of interest detection. These embodiments may be similar to the object detection embodiments above but filtered on regions as opposed to specific objects.

The nightvision system 100 may be implemented where the nightvision system comprises an eye tracker 123 coupled to the image processor 119 to track a user's eye with respect to the processed brightness maps produced by the image processor. In some such embodiments, the tunable filter array 120 is configured to filter at least a portion of the input light into the underlying device 104 based on tracking a user's eye with respect to the processed brightness maps produced by the image processor. In particular, embodiments can determine what objects a user is looking at in a nightvision scene using the eye tracker 123 and can perform filtering functionality for those objects based on that determination.

The nightvision system 100 may be implemented where the nightvision system 100 comprises an aiming laser 125 coupled to the image processor to facilitate aiming the nightvision system. In some such embodiments, the tunable filter array 120 is configured to filter the input light into the underlying device 104 based on tracking the aiming laser 125 with respect to the processed brightness maps produced by the image processor 119.

The nightvision system 100 may be implemented where the nightvision system 100 comprises an aiming laser 125 coupled to the image processor to facilitate aiming the nightvision system. In some such embodiments, the tunable filter array 120 is configured to filter at least a portion of the input light into the underlying device 104 based on tracking the aiming laser 125 with respect to the processed brightness maps produced by the image processor 119.

In some embodiments the nightvision system 100 may be implemented where the tunable filter array is configured to provide information to a user to indicate to the user manual filtering adjustments that can be made with respect to providing additional input light into the underlying device 104. For example, as discussed previously, the transparent optical device 118, may include not only detector functionality, but may also include display functionality. Thus, using the display functionality, information may be output to the user to indicate to the user that manual adjustments should be performed to cause certain objects, regions, etc. to have a certain contrast for the user. In a similar embodiment, the display functionality may be able to highlight, such as by pointing to and/or outlining an object for which contrast is enhanced. A user can then select other objects to have contrast enhanced. Selection of these other objects can be performed by using a user interface to select the object in the nightvision scene, which can be used to cause the tunable filter array 120 automatically adjust filtering to enhance contrast for the selected object. Alternatively, or additionally, the user can simply perform a manual override to manually adjust tunable filter array filtering on a particular object based on information presented to the user using the display functionality of the transparent optical device 118.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
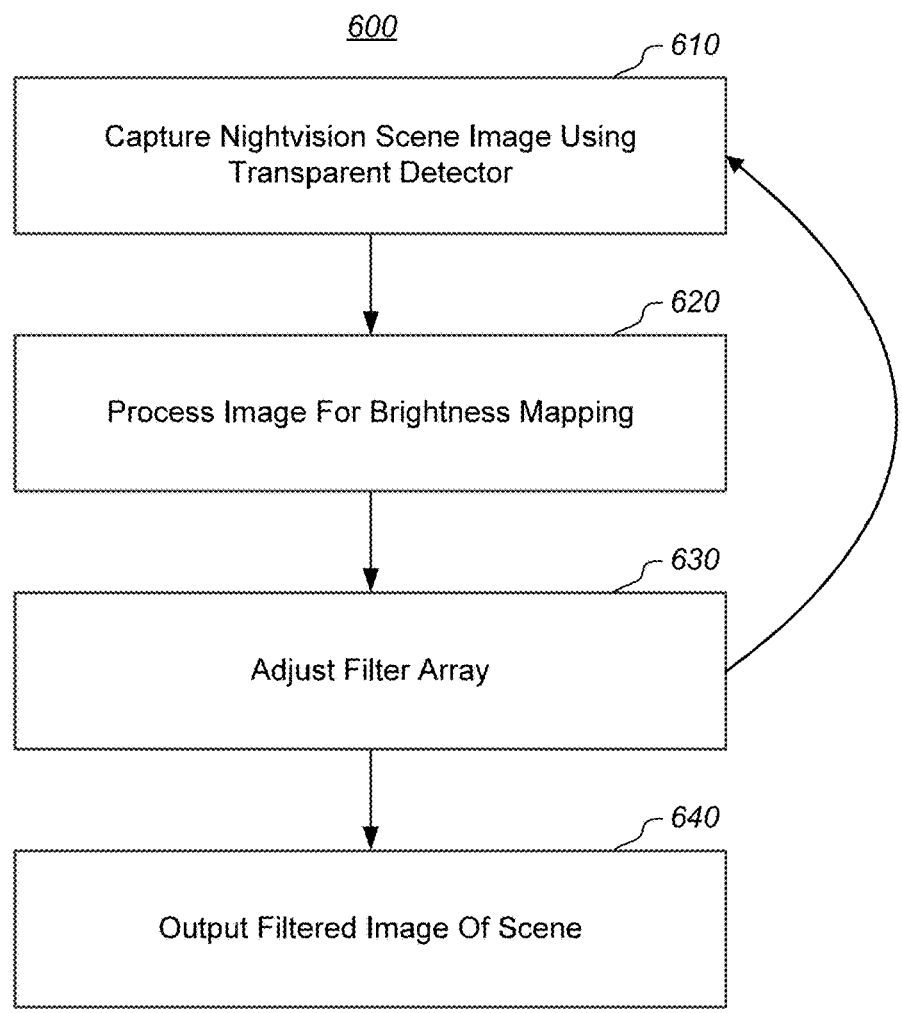
FIG. 6 illustrates a method of performing filtering functionality in a nightvision system using transparent optical devices.

Referring now to FIG. 6, a method 600 is illustrated. The method 600 includes capturing a nightvision scene image using a transparent detector (act 610). For example, the transparent optical device 118 may be used to capture a nightvision scene as described above. The method 600 includes processing a brightness map for filtering quality (act 620). For example, the image processor 119 can determine filtering quality (e.g., contrast) of the captured nightvision scene. The method 600 may further include adjusting filtering based (act 630) based on the processing of act 620. Acts 610-630 can be repeated as needed to perform filtering functionality.

The method 600 includes outputting a filtered image of a scene (act 640). For example, the underlying device 104 can output a filtered scene image to a user.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A nightvision system comprising:
    an underlying device, the underlying device configured to provide output light in a first spectrum from input light received at the underlying device;
    a transparent optical device optically coupled in an overlapping fashion to the underlying device, wherein the transparent optical device is configured to transmit light in the first spectrum from the underlying device through the transparent optical device, the transparent optical device comprising: an active area of a semiconductor chip, the active area comprising:
        a first plurality of active elements configured to cause the underlying device to detect light from the underlying device; and
        a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for light in the first spectrum; and
    the nightvision system further comprising an image processor configured to process images produced using light detected by the first plurality of active elements to perform at least one of object edge detection, object recognition, or region of interest identification; and
    a tunable filter array coupled to the image processor, the tunable filter array configured to filter out at least a portion of the input light into the underlying device based on image processing performed by the image processor, wherein the tunable filter array comprises a plurality of pixels, and wherein different pixels are configured to filter out input light based on the image processing performed by the image processor using at least one of the object edge detection, object recognition, or region of interest identification in a fashion that highlights an object by filtering out light around the object such that image contrast can be sacrificed to improve contrast on the highlighted object.

2. The nightvision system of claim 1, wherein the tunable filter array is configured to function in concert with an underlying device power supply to optimize dynamic range of the underlying device.

3. The nightvision system of claim 1, wherein the underlying device comprises an image intensifier.

4. The nightvision system of claim 1, wherein the tunable filter array comprises an active driven neutral density filter array.

5. The nightvision system of claim 1, wherein the tunable filter array comprises an LCD array.

6. The nightvision system of claim 1, wherein the image processor identifies one or more bright spots, and wherein the tunable filter array is configured to filter the input light into the underlying device based on bright spot identification to filter light from the one or more bright spots.

7. The nightvision system of claim 1, wherein the image processor identifies one or more halos, and wherein the tunable filter array is configured to filter the input light into the underlying device based on halo identification to filter light causing the one or more halos at a first amount and to filter light corresponding to the halo at a second amount that is lower than the first amount.

8. The system of claim 1, wherein processing images comprises identifying known hand gestures, and wherein the filter array is configured to filter at least a portion of the input light into the underlying device to highlight the known hand gestures.

9. The system of claim 1, wherein processing images comprises using eye tracking, and wherein the filter array is configured to filter at least a portion of the input light into the underlying device based on the eye tracking.

10. A method of performing filtering functionality in a nightvision system, the method comprising:
providing output light, from an underlying device, in a first spectrum from input light received at the underlying device;
transmitting the light in the first spectrum through a transparent optical device optically coupled in an overlapping fashion to the underlying device, through an active area of a semiconductor chip, through a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for the light in the first spectrum;
detecting light from the underlying device using a first plurality of active elements configured in the active area;
processing brightness maps produced using light detected by the first plurality of active elements at an image processor to perform at least one of object edge detection, object recognition, or region of interest identification; and
filtering out the input light into the underlying device based on image processing performed by the image processor on the brightness maps using a tunable filter array coupled to the image processor, wherein filtering out the light is performed using at least one of the object edge detection, object recognition, or region of interest identification in a fashion that highlights an object by filtering out light around the object such that image contrast can be sacrificed to improve contrast on the highlighted object.

11. The method of claim 10, wherein processing brightness maps comprises using at least one of eye tracking, or laser aiming and wherein the tunable filter array is configured to filter the input light into the underlying device based on the least one of eye tracking, or laser aiming.

12. The method of claim 10, wherein filtering out the input light into the underlying device is performed in concert with an underlying device power supply to optimize dynamic range of the underlying device.

13. The method of claim 10, wherein providing output light from the underlying device comprises outputting light from a phosphor screen of an image intensifier.

14. The method of claim 10, wherein processing brightness maps further comprises identifying one or more bright spots, and wherein filtering out the input light into the underlying device comprises filtering out the input light into the underlying device based on bright spot identification to filter out light from the one or more bright spots.

15. The method of claim 10, wherein processing brightness maps further comprises identifying one or more halos, and wherein filtering out the input light into the underlying device comprises filtering out the input light into the underlying device based on halo identification to filter out light from the one or more halos.

16. The method of claim 10, wherein processing brightness maps further comprises identifying local saturation, and wherein filtering out the input light into the underlying device comprises filtering out the input light into the underlying device based on local saturation to filter out light causing the local saturation.

17. The method of claim 10, wherein processing brightness maps comprises identifying known hand gestures, and wherein filtering out the input light into the underlying device comprises filtering out the input light into the underlying device to highlight the known hand gestures.

18. The method of claim 17, wherein processing brightness maps comprises identifying known hand gestures, and wherein the tunable filter array is configured to filter the input light into the underlying device to highlight the known hand gestures.

19. The method of claim 17, wherein processing brightness maps comprises using eye tracking, and wherein the tunable filter array is configured to filter the input light into the underlying device based on the eye tracking.

20. A method of manufacturing a nightvision system comprising:
coupling a transparent optical device optically, in an overlapping fashion, to an underlying device, the underlying device configured to provide output light in a first spectrum from input light received at the underlying device, wherein the transparent optical device is configured to transmit light in the first spectrum from the underlying device through the transparent optical device, the transparent optical device comprising: an active area of a semiconductor chip, the active area comprising:
a first plurality of active elements configured to cause the underlying device to detect light from the underlying device;
a first plurality of transparent regions formed in the active area which are transparent to the light in the first spectrum to allow light in the first spectrum to pass through from the underlying device to a user, the first plurality of transparent regions being configured in size and shape to cause the transparent optical device to have a first transmission efficiency for light in the first spectrum;
coupling an image processor to the transparent optical device, the image processor configured to process brightness maps produced using light detected by the first plurality of active elements to perform at least one of object edge detection, object recognition, or region of interest identification; and
coupling a tunable filter array to the image processor, wherein the tunable filter array is configured to filter out the input light into the underlying device based on brightness map processing performed by the image processor, wherein the tunable filter array comprises a plurality of pixels, and wherein different pixels are configurable to filter input light based on the image processing performed by the image processor using at least one of the object edge detection, object recognition, or region of interest identification in a fashion that highlights an object by filtering out light around the object, thereby creating an outline around the object.

\* \* \* \* \*